US011432108B2

(12) United States Patent
Lauterbach et al.

(10) Patent No.: US 11,432,108 B2
(45) Date of Patent: Aug. 30, 2022

(54) PRIVACY PROTECTION GATEWAY FOR VEHICLES (71) Applicant: Telefonaktiebolaget LM Ericsson (publ), Stockholm (SE)

(72) Inventors: Tim Lauterbach, Kerkrade (NL); Alexander Federlin, Korschenbroich (DE); Thomas Weidenfeller, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1020 days.

(21) Appl. No.: 15/501,717

(22) PCT Filed: Aug. 4, 2015

(86) PCT No.: PCT/EP2015/067974
§ 371 (c)(1),
(2) Date: Feb. 3, 2017

(87) PCT Pub. No.: WO2016/020393
PCT Pub. Date: Feb. 11, 2016

(65) Prior Publication Data
US 2017/0230797 A1    Aug. 10, 2017

(30) Foreign Application Priority Data
Aug. 6, 2014    (EP) .................................... 14180067

(51) Int. Cl.
*H04W 4/02*       (2018.01)
*H04W 4/46*       (2018.01)
*H04W 12/02*     (2009.01)
*H04L 9/40*       (2022.01)
(Continued)

(52) U.S. Cl.
CPC ......... *H04W 4/023* (2013.01); *H04L 63/0281* (2013.01); *H04L 63/0823* (2013.01);
(Continued)

(58) Field of Classification Search
CPC ..... H04W 4/023; H04W 12/02; H04W 12/06; H04W 4/046; H04W 88/16; H04W 12/12;
(Continued)

(56) References Cited

U.S. PATENT DOCUMENTS 8,402,117 B2 †    3/2013    Zellner
2013/0111596 A1*  5/2013    Rayes ................... H04L 41/28
                                                726/26

FOREIGN PATENT DOCUMENTS

CN    101310490 A    11/2008
CN    103891248 A     6/2014
WO    2013189974 A2  12/2013

OTHER PUBLICATIONS

ETSI, "Geomessaging Enabler", TS 103 084 V0.0.2, Jun. 2012, 1-36.
(Continued)

*Primary Examiner* — Dady Chery
(74) *Attorney, Agent, or Firm* — Murphy, Bilak & Homiller, PLLC (57) ABSTRACT

The invention relates to a method to process data packets of a vehicle message received by a privacy gateway (100) from a vehicle (10) via a mobile communications network (20). The method comprises the following steps: The vehicle message transmitted by the vehicle (10) is received. A source IP address in the data packets of the vehicle message is identified. The source IP address in the data packets of the vehicle message is replaced by an IP address of a location collecting entity (50) of the mobile communications network (20). Said mobile communications network collects location information of a plurality of vehicles (10) resulting in an adapted vehicle message with adapted data packets containing the IP address of the location collecting entity as source IP address. Then, the adapted vehicle message is transmitted to a service providing entity (40) which is configured to provide location dependent services for the plurality of vehicles.

18 Claims, 6 Drawing Sheets (51) Int. Cl.
| | | |
|---|---|---|
| *H04L 67/5651* | (2022.01) | |
| *H04L 67/12* | (2022.01) | |
| *H04W 12/06* | (2021.01) | |
| *H04L 101/668* | (2022.01) | |
| *H04W 12/12* | (2021.01) | |
| *H04W 88/16* | (2009.01) | |

(52) U.S. Cl.
CPC ............ *H04L 63/101* (2013.01); *H04L 67/12* (2013.01); *H04L 67/2828* (2013.01); *H04W 4/46* (2018.02); *H04W 12/02* (2013.01); *H04W 12/06* (2013.01); *H04L 61/6068* (2013.01); *H04W 12/12* (2013.01); *H04W 88/16* (2013.01)

(58) Field of Classification Search
CPC ............... H04L 63/0823; H04L 63/101; H04L 61/6068
See application file for complete search history.

(56) References Cited

OTHER PUBLICATIONS

ETSI, "Intelligent Transport Systems (ITS); European profile standard for the physical and medium access control layer of Intelligent Transport Systems operating in the 5 GHz frequency band", ETSI ES 202 663 V1.1.0, Nov. 2009, 1-27.

ETSI, "Intelligent Transport Systems (ITS); Security; Security header and certificate formats", Draft ETSI TS 103 097 V1.1.8, Jul. 2014, 1-36.

ETSI, "Intelligent Transport Systems (ITS); Vehicular Communications; Basic Set of Applications; Part 2: Specification of Cooperative Awareness Basic Service", Draft ETSI EN 302 637-2 V1.3.0, Aug. 2013, 1-41.

ETSI, "Intelligent Transport Systems (ITS); Vehicular Communications; Basic Set of Applications; Part 3: Specifications of Decentralized Environmental Notification Basic Service", Draft ETSI EN 302 637-3 V1.2.0, Aug. 2013, 1-62.

Yeh, Lo-Yao, "A Proxy-Based Authentication and Billing Scheme With Incentive-Aware Multihop Forwarding for Vehicular Networks", IEEE Transactions on Intelligent Transportation Systems, vol. 15, No. 4, Aug. 2014, 1607-1621.

Requirements from Session Initiation Protocol, Hautakorpi et al., Internet Engineering Task Force ISSN: 2070-1721, Apr. 2010.†

Marco Gruteser et al., Anonymous Usage of Location-Based Services Through spatial and Temporal Cloaking, May 5-8, 2003, MobiSys Proceedings of the 1st International Conference on Mobile Systems pp. 31-42, San Francisco CA.†

\* cited by examiner
† cited by third party

PRIVACY PROTECTION GATEWAY FOR VEHICLES

TECHNICAL FIELD

The present invention relates to a method to process data packets of a vehicle message received by a privacy gateway from a vehicle via a mobile communications network, and to the privacy gateway. The invention furthermore relates to a computer program, a computer program product and a carrier containing the computer program.

BACKGROUND

In an Intelligent Transport System (ITS) 5 GHz (ITS-G5) system as proposed by ETSI (ES 202 663), vehicles send data using WiFI (802.11p) including messages containing location specific information. The messages are defined in the following ITS specifications:
  CAM base specification (EN 302637-2 v1.3.0)
  DENM base specification (EN 302637-3 v1.2.0)

The nature of the transferred data does not necessitate the identification of the sender, i.e. the sending vehicle, nor is it desirable to make the identification possible. Quite the opposite, protecting the identity of the sender is intended and a high priority. In order to maintain the highest level of privacy when transferring geolocation related data from automotive applications, it is desirable to separate the content from the metadata as much as possible.

In the ITS-G5 system these messages are sent as WiFi broadcasts. The sender of the messages is only identified by a pseudonymous certificate used to sign the message. This is only necessary to enable the receivers to verify that the message was sent by an authorized participant of the system. The pseudonymous certificate is regularly exchanged. This avoids a vehicle being repeatedly identifiable by an attacker listening to the transmission of passing vehicles.

Currently investigations are made to not only use WiFi broadcasting for obtaining data from automotive applications, but also mobile data networks (3G, LTE, etc.) using IPv6 unicasting. As part of these investigations, a backend architecture containing service providers (SPs) is introduced. The SPs act as central instances to receive the messages from vehicles via the mobile data network. An SP, after receiving geolocation related data from automotive applications, processes them, and provides services based on the result of the processing. As part of the provision of services, the SPs might contact vehicles to provide them with information, for example road condition or weather information.

The WiFi-broadcast based ITS-G5 solution needs a certain market penetration in order to function properly. This triggered the idea to use mobile data networks as a complementary transport for the messages as specified in ITS-G5. However, the broadcast concept of ITS-G5 cannot be immediately translated to an IP network using mobile data networks. The reason for this is that in mobile data networks the user equipment (UE)/mobile phone is not capable and not intended to broadcast payload.

UEs use unicast connections for data communication on a mobile data network. One issue of using unicast is the privacy of the vehicle, which is compromised when it sends its location data using a permanent sender IP address—as is the case with IPv6. It enables an eavesdropper on the Internet to at least determine if a specific vehicle is transmitting data (i.e. is moving), just by looking at the metadata (i.e. IPv6 addresses) of the relevant data streams, even without having access to the actual (encrypted) content of the message.

Given enough data points, a traffic pattern can be created for that IP address. This in turn makes it possible to infer the real life identity of the subscriber.

SUMMARY

Accordingly, a need exists to be able to use a mobile communications network to transmit location information of a vehicle while assuring that the identity of the vehicle or transmitting UE cannot be identified.

This need is met by the features of the independent claims. Further aspects are described in the dependent claims.

A method is provided to process data packets of a vehicle message received by a privacy gateway from a vehicle via a mobile communications network. The vehicle message transmitted by the vehicle is received at the privacy gateway. Furthermore, a source IP address of the data packets of the vehicle message is identified and the source IP address in the data packets of the vehicle message is replaced by an IP address of a location collecting entity of the mobile communications network which collects location information of a plurality of vehicles resulting in an adapted vehicle message with adapted data packets containing the IP address of the location collecting entity as source IP address. Furthermore, the adapted vehicle message is transmitted to the service providing entity which is configured to provide location dependent services for the plurality of vehicles.

With the replacement of the IP address of the sending vehicle using the IP address of the location collecting entity a tracking of the vehicles by eavesdropping the communication on the Internet towards the service providing entity/service provider becomes impossible. This replacement furthermore prohibits the direct communication with the vehicle from outside of the mobile communications network. The communication of the vehicle towards the outside world will terminate inside the mobile communications network in the privacy gateway. The privacy gateway can then forward the received vehicle messages to the service providing entities after substituting the vehicle's source IP address with the IP address of the location collecting entity. The exchange of the source address has the effect that the direct return communication from the service providing entities to the vehicle is not possible. To substitute for this loss, the location collecting entity, also called geographic enabler hereinafter, is deployed. As the location collecting entity or geographic enabler collects location information of the vehicles, the location collecting entity allows the service providing entity to address a vehicle by its location, i.e. the location the service providing entity received in the message. The service providing entity can reach the corresponding location collecting entity by utilizing the source IP address it received as part of the vehicle message. The location collecting entity then forwards the information to the vehicles based on the location of the vehicles. As described above, this IP address is no longer the source IP address of the vehicle sending the message, but it was substituted by the IP address of the location collecting entity.

The invention furthermore relates to the corresponding privacy gateway which is configured to process the data packets of the vehicle as discussed above, the privacy gateway comprising a receiver configured to receive the vehicle messages sent by the vehicle. Furthermore, a data processing unit is provided which is configured to identify the source IP address in the data packets of the vehicle message and configured to replace the source IP address in the data packets of the vehicle by an IP address of a location collecting entity of the mobile communications network which collects the location information of a plurality of vehicles. This results in an adapted vehicle message with adapted data packets containing the IP address of the location collecting entity as source IP address. A transmitter transmits the adapted vehicle message to the service providing entity which is configured to provide location dependent services for the plurality of vehicles.

The invention furthermore relates to a computer program comprising instructions which, when executed on at least one control unit, cause the at least one control unit to carry out the above-described method for processing data packets. Furthermore, a computer program product comprising the computer program and a carrier containing the computer program is provided.

BRIEF DESCRIPTION OF THE DRAWINGS

The above and other needs, features and advantages of the present invention will become apparent from the following description of embodiments given in conjunction with the accompanying drawings.

DETAILED DESCRIPTION

In the following concepts according to embodiments of the invention will be explained in more detail by referring to the accompanying drawings.

Figure 1:
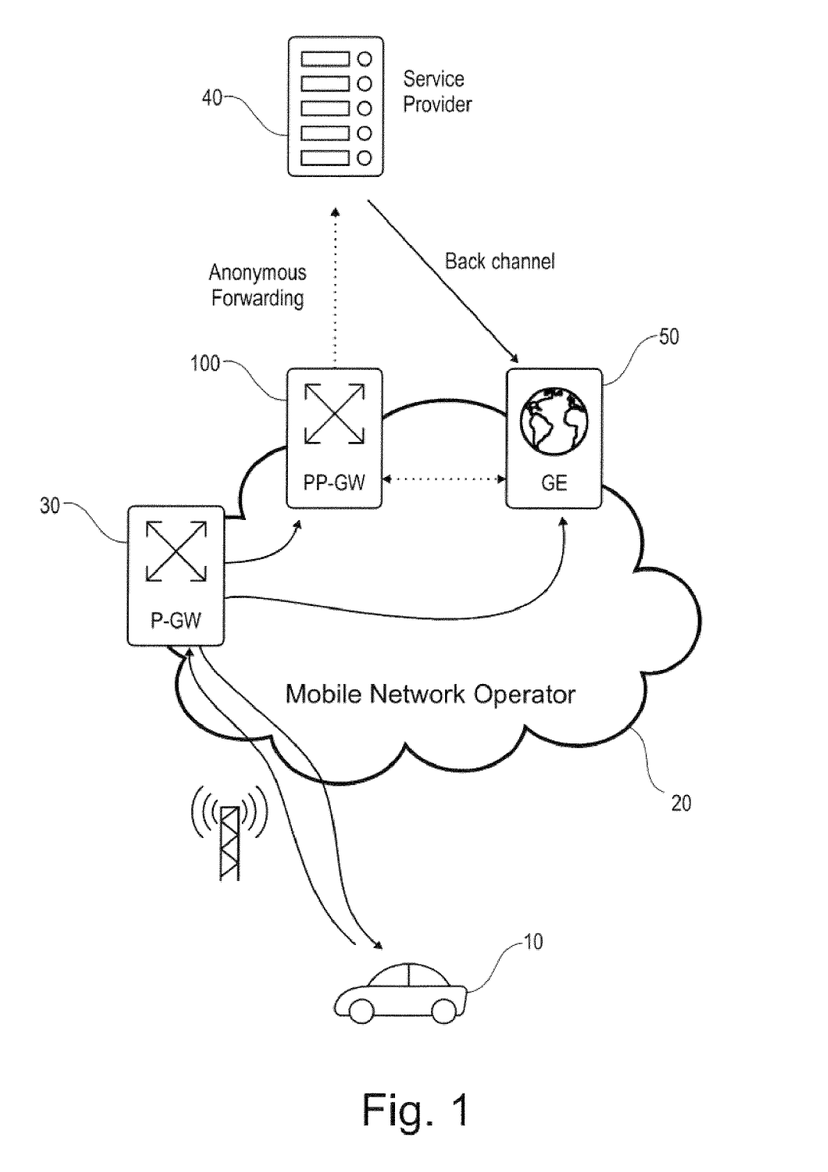
FIG. 1 is a schematic architectural view of a system in which location information is transmitted from a vehicle to a service provider via a mobile communications network, wherein the privacy of the vehicle is maintained.

FIG. 1 shows a high level architectural view of a system in which vehicle related information such as position and speed vectors of a vehicle or any other information of a vehicle are transmitted to a service providing entity/service provider (SP) 40. The service provider is connected to the public Internet or a private network and expects to receive messages from vehicles, such as the vehicle 10 shown in FIG. 1. Furthermore, a geolocation messaging system is given. From this system a geographic enabler or location collecting entity 50 is shown in FIG. 1. The location collecting entity 50 is connected to the Internet or private network. It receives messages for further distribution from the Internet or the private network, marked as "Back channel" in FIG. 1. The location collecting entity 50 is furthermore connected to a mobile data network or mobile communications network 20 (3G, LTE (Long-Term Evolution) or others). The location collecting entity 50 uses the mobile network 20 to allow vehicles to register for a geolocation messaging service. The vehicle 10 is connected to the mobile communications network 20. The intelligent traffic system in the vehicle generates messages based on internal or external stimulus. By way of example, messages are generated because of a specific weather or a road condition or because some internal timer for a regular repeated messages expired. These messages, called vehicle messages, depending on the type of message might contain geographic location information such as the vehicle's location. The messages are digitally signed with a certificate in accordance with ITS-G5 standards or other procedures. The mobile entity in the vehicle receives the messages and transports them over the network 20 using a unicast connection with the destination of the service provider 40. The connected vehicle 10 furthermore registers at some point with the geolocation messaging system including the location collecting entity 50.

Furthermore, a privacy protection (PP) or short privacy gateway 100 is provided which is connected to the Gi, SGi or a similar interface of the mobile communications network 20. The gateway 100 is furthermore directly or indirectly connected to the Internet or the private network to which the service provider 40 is connected. The privacy gateway 100 is furthermore connected to the mobile communications network's anti-fraud security system (not shown), the user data management (not shown) and/or any other system in the mobile network capable of excluding, registering, handling and/or imposing restrictions on a mobile data network user. The gateway 100, on system startup, during configuration or any other time via some special procedure executed by the geographic location system, the gateway 100 itself or a third party or any other suitable procedure receives the Internet address of the location collecting entity 50 or its address in the private network. The gateway 100 is further updated on any change of that address by the above-mentioned means or any other suitable procedure. In the same way the gateway 100 is provisioned, on system startup, during configuration or any time via some special procedure executed by the gateway 100 itself, by a service provider 40 or by a third party with an IP address of one or more service providers 40. The mobile communications network 20 forwards selected messages sent by UEs of the vehicles 10 to the gateway 100 via the Gi, SGi or similar interface. The selection is based on such criteria such as destination IP address, APN (Access Point Name), message signed with a certificate or similar criteria or a combination thereof which allows the separation of other traffic from intelligent transport data traffic. The vehicle messages sent by the vehicles 10 are received by a packet gateway 30 from where they are forwarded to the privacy gateway 100 based on criteria mentioned above, such as destination IP address, APN or the message being signed with a certain certificate.

Figure 2:
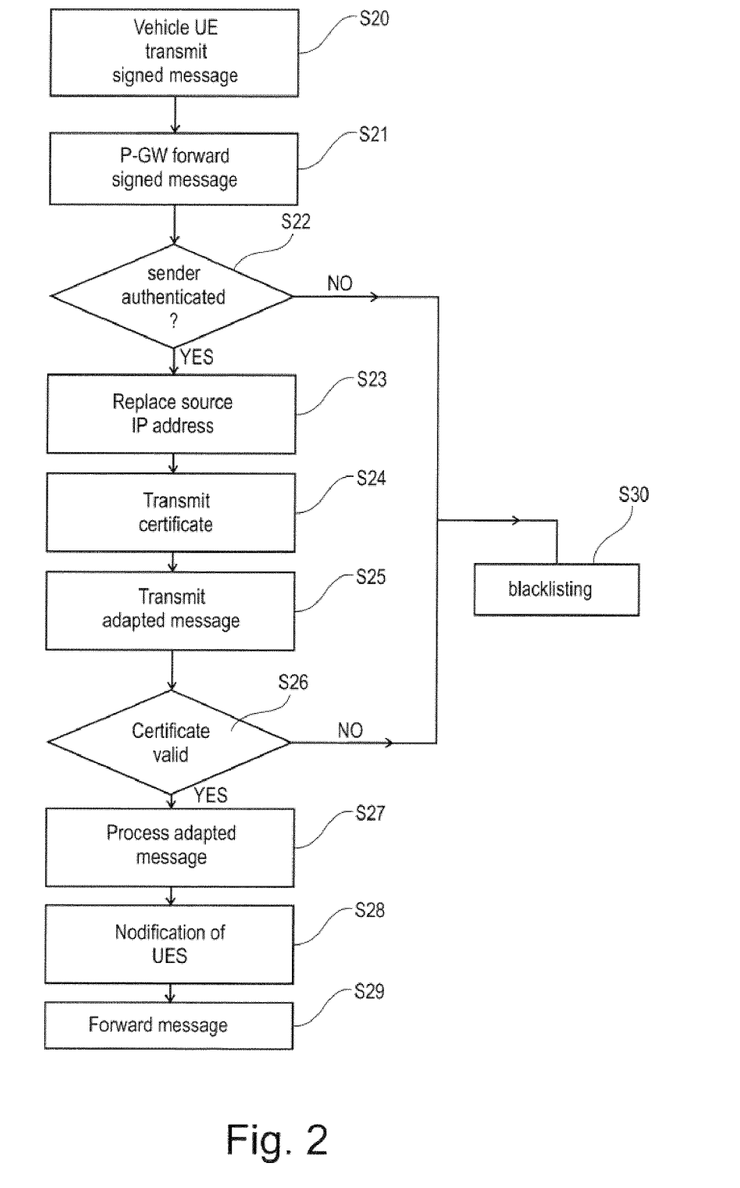
FIG. 2 is a flowchart containing different steps carried out by the different entities shown in FIG. 1, in which the privacy of the vehicle is maintained while the vehicle provides location information to the service providing entity.

FIG. 2 summarizes the steps carried out by some of the entities shown in FIG. 1. As shown in step S20, a vehicle, i.e. the mobile network device of the vehicle, transmits or forwards a signed message to the mobile network, wherein the packet gateway 30 in step S21 forwards the signed message to the privacy gateway 100. On reception of the message, the gateway 100 verifies if the destination IP address is one of the service provider's IP addresses known to the gateway 100 (step S22). If this is not the case, the privacy gateway 100 informs the network's anti-fraud system or any other similar system about the fact and drops the message. Furthermore, as indicated in step S30, the vehicle is blacklisted, the current message and all further messages and communication from and to the vehicle is blocked or dropped or ignored. The blacklisting and the resulting message blocking or dropping is performed by informing the anti-fraud system of the network 20 or an anti-fraud system operated separately about the event. If, however, in step 22 the privacy gateway 100 determines that the message is properly signed, it replaces the source IP address in the received vehicle message with the known IP address of the location collecting entity 50 (step S23). Furthermore, as indicated in step S24 the gateway 100 may transmit the certificate with which the vehicle was signed to the location collecting entity 50. The location collecting entity may use the certificate to later on forward messages received from the service provider containing certificates to the corresponding vehicle. In step S25 the adapted message in which the source IP address of the mobile phone in the vehicle is replaced by the IP address of the location collecting entity is transmitted to the service provider 40.

In case a protocol like UDP (Universal Data Protocol) is used, no additional protocol handling needs to be done by the privacy gateway 100.

In case a protocol like TCP (Transmission Control Protocol) is used, some additional handling is required, due to the properties of TCP. The vehicle's TCP connection is properly terminated in the gateway 100, the gateway 100 acting as a proxy for the destination service provider, claiming to have the destination service provider's IP address. Further, the privacy gateway 100 involves the help of the location collecting entity 50 for forwarding the TCP packets towards the service provider 40 (not shown in the figure). The location collecting entity 50 handles state information associated with TCP towards the service provider on behalf of the vehicle. It sets up a TCP connection towards the service provider when forwarding messages on behalf of the gateway 100 to the service provider. This ensures that the source address of the TCP connection towards the service provider is the IP address of the location collecting entity 50.

The service provider 40 upon reception of the message via the Internet or private network verifies if the message's source IP address is a known IP address of a location collecting entity. If not, the service provider discards the message. Further, if the message was transported via a TCP connection and the source IP address is not that of a known location collecting entity, the service provider drops the TCP connection. In both cases the service provider can add the offending IP address to its own firewall, to block further attempts from that unknown address.

If it is determined that the source IP address is that of a known location collecting entity the service provider 40 continues with checking if the message is properly signed with a valid certificate in S26. If it is determined in step S26 that the message is signed with the correct certificate, the service provider processes the adapted message in whatever way necessary to provide the service or services it is supposed to provide (step S27).

If for whatever reason the service provider wants to provide a vehicle or a group of vehicles with an information, e.g. service information in response to messages received or for other reasons, the service provider constructs a geolocation messaging request using the geolocation or locations previously received in which the mobile entities in the corresponding vehicles should be notified of the information generated by the service provider (step S28). The service provider then forwards the request to the location collecting entity in step S29 using the IP address of the location collecting entity it has received in the adapted message as source address. The location collecting entity knows the locations of the different vehicles, and if vehicles in a certain geographic location should be provided with a certain service, the location collecting entity forwards the service or message to the corresponding vehicles which are located in the area for which the service providing entity wants to provide a service (step S29). It should be understood that the messages carried out at the different entities, such as the privacy gateway or the service provider, need not to be carried out in the indicated order. Within the different entities another sequential order of the steps may be carried out.

Figure 3:
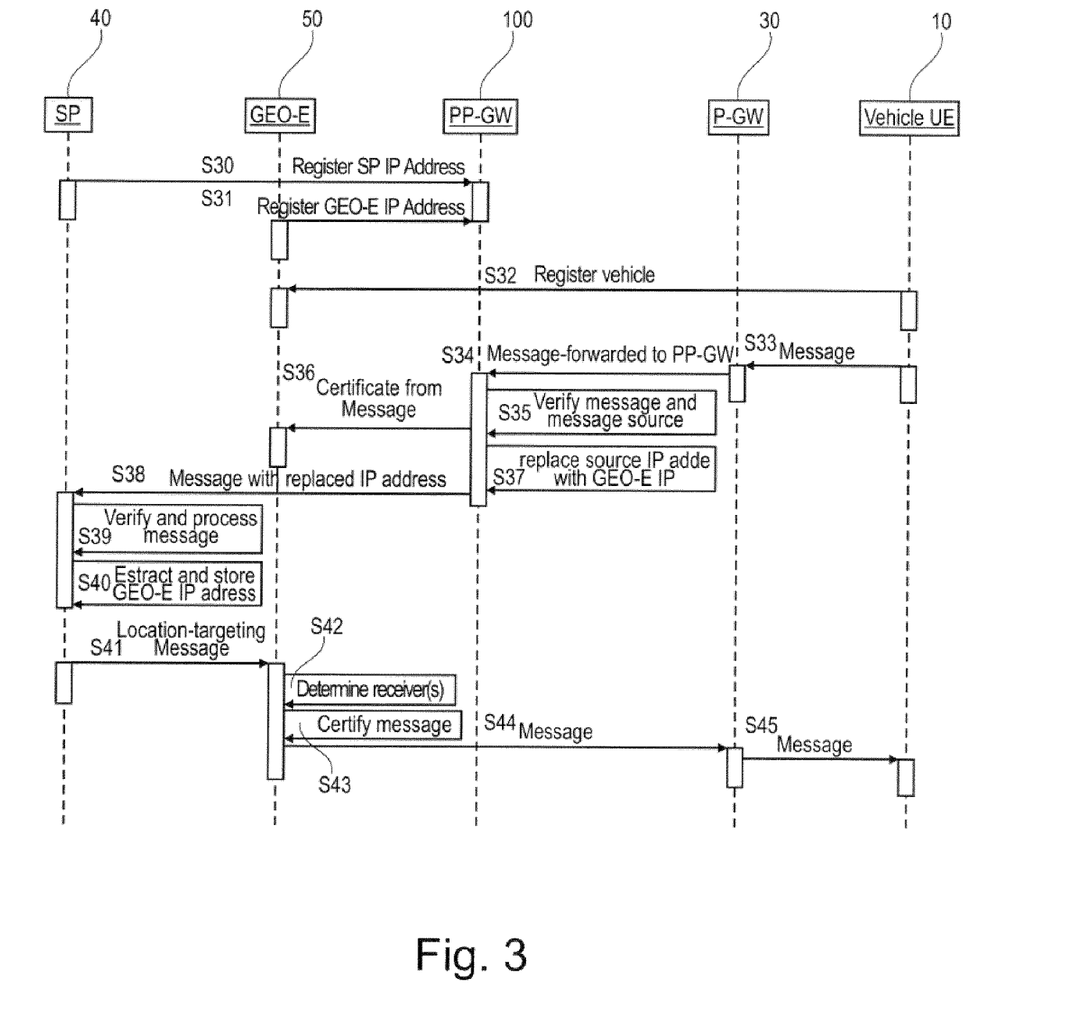
FIG. 3 shows a message exchange between the different entities shown in FIG. 1 with location based information being sent to the service providing entity, the service providing entity providing location messages to the vehicle.

FIG. 3 shows one particular flow of messages carried out by some of the components shown in the embodiment of FIG. 1. In steps S30 and S31 the message exchange starts with a service provider and the geographic enabler or location collecting entity 50 registering their respective IP addresses with the privacy gateway 100. This registration procedure is just an example and there are other possibilities how the privacy gateway 100 can be made aware of these IP addresses. Another possibility is a configuration step at the privacy gateway 100. At some point in time in step S32 a vehicle registers with the location collecting entity 50 for a geolocation message. At a later point in time the vehicle sends an anonymous message in step S33. Although the destination IP address in that message is that of the service provider, the packet gateway 30 detects that this is specific ITS traffic. The detection can, for example, happen based on the APN used to send the message. Once the packet gateway has determined that the message needs special handling, it forwards the message to the privacy gateway (step S34) and not to the service provider. The privacy gateway 100 verifies in step S35 if the message is acceptable and if yes forwards the message certificate to the location collecting entity 50 (step S36). In step S37, the gateway 100 replaces the source IP address in the message, the vehicle IP address, with the IP address of the location collecting entity (step S37). In step S38 the message with the replaced IP address is then transmitted to the service provider 40 (step S38). The service provider in step S39 verifies the message and processes it in accordance with the procedures needed to provide the service. In step S40, the service provider extracts and stores the IP address of the location collecting entity. If at some point in time the service provider might decide that there is a need to provide a vehicle or a set of vehicles with some information, the service provider generates a location targeting message, i.e. a message where the intended receivers are identified by locations or areas or any other geographic information and not by the IP address, and the message is transmitted in step S41 to the location collecting entity. The service provider did previously learn the IP address of the responsible location collecting entity. The location collecting entity then determines the intended receivers in step S42, checks the target location against the location of the registered users and certifies the messages (step S43) and then forwards the message via unicast to the intended vehicle mobile entities via packet gateway 30 (steps S44 and S45).

Figure 4:
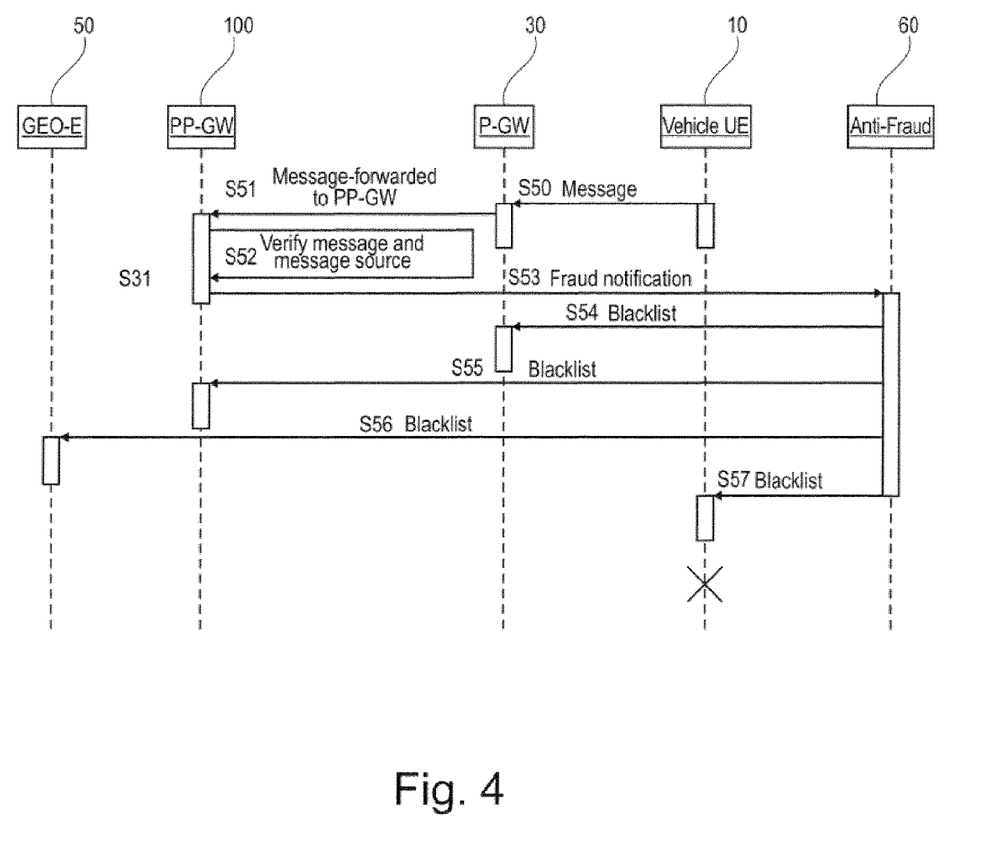
FIG. 4 shows a message exchange between different entities when a message is received from an uncertified vehicle.

FIG. 4 shows an example when a message cannot be verified by the privacy protection gateway 100. In steps S50 and S51 a vehicle message is sent via packet gateway 30 to the privacy gateway 100, these steps corresponding to steps S33 and S43 discussed above in connection with FIG. 3. In step S52 the privacy gateway 100 verifies the message and the message source and determines that the message is not received from an authorized vehicle. In step S53 the privacy gateway then informs an anti-fraud system 60 about this fact. In the example shown the anti-fraud system 60 decides to perform extensive blacklisting of the corresponding UE by sending a blacklist message to the packet gateway, the privacy gateway and the location collecting entity and the vehicle in steps S54 to S57.

Figure 5:
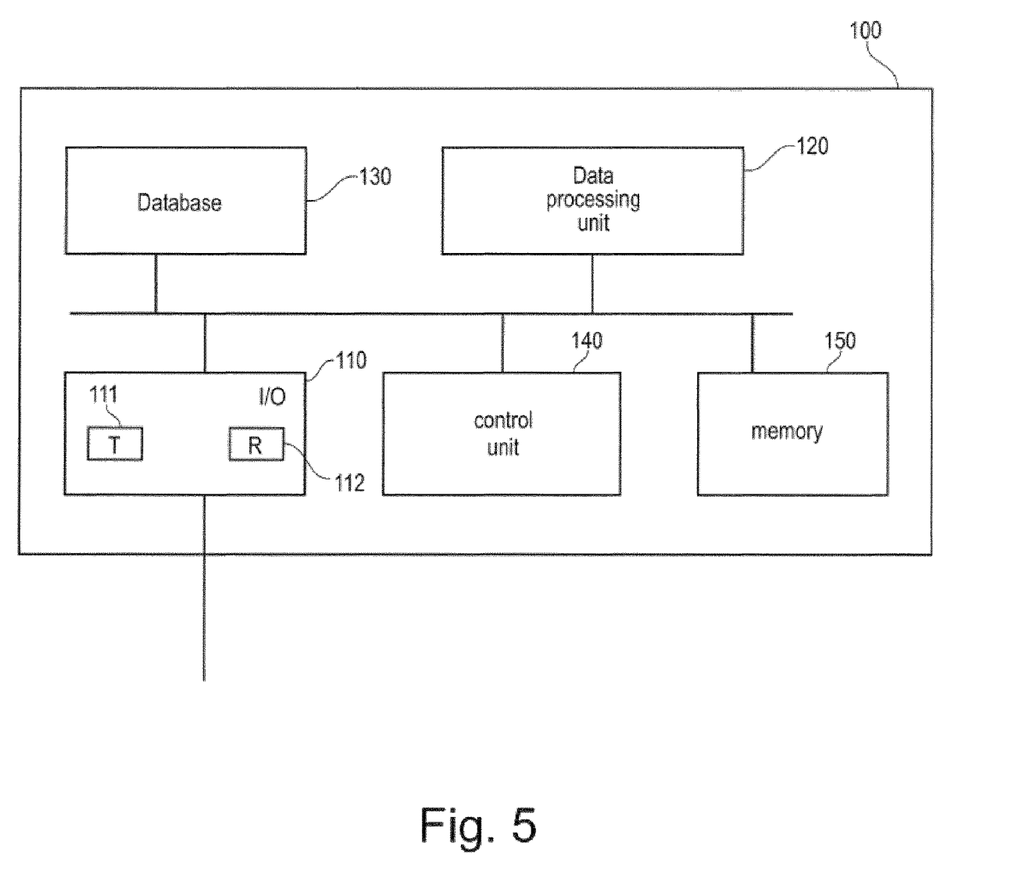
FIG. 5 is a schematic view of a privacy gateway shown in FIG. 1 which forwards vehicle data to the service providing entity with a replaced source IP address.
Figure 6:
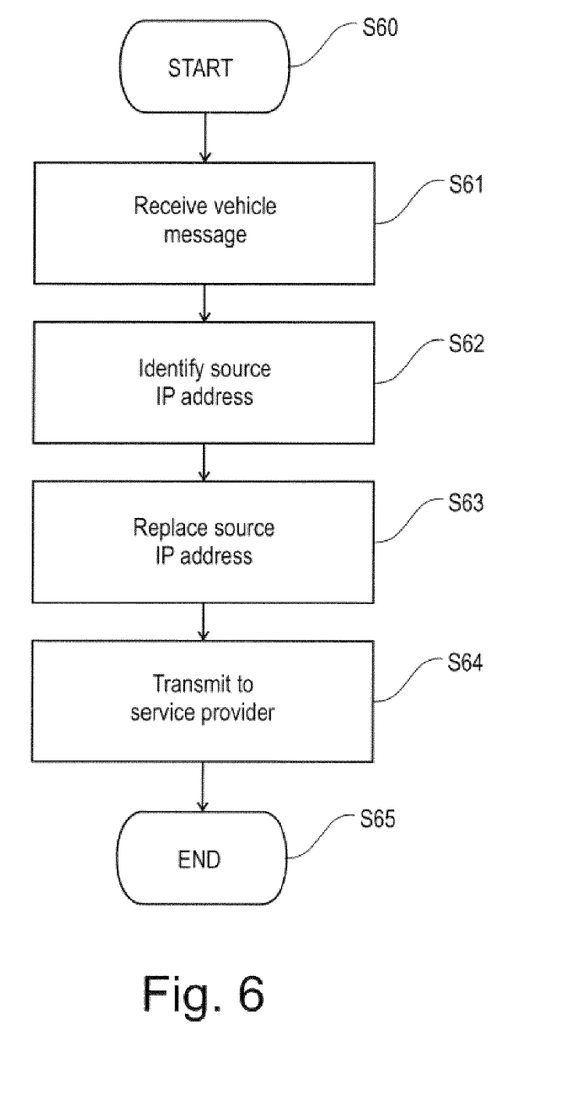
FIG. 6 shows a flowchart indicating the main steps carried out by the privacy gateway of FIG. 5 when a vehicle message is forwarded to the service providing entity.

FIG. 5 illustrates an exemplary structure of the privacy gateway 100. The privacy gateway 100 contains an input-output unit 110 including a transmitter 111 and a receiver 112. The transmitter symbolizes the possibility of the gateway 100 to transmit data to other entities and to communicate with other entities, the receiver 112 symbolizing the capability to receive information or data from other entities. A data processing unit 120 is provided which is responsible for the adaptation of the vehicle messages as described above. The data processing unit 120 replaces the source IP address in the vehicle message by the IP address of the location collecting entity so that adapted data packets of the adapted vehicle message are generated that is then transmitted further to the servicer provider using transmitter 111.

A database 130 is provided in which different pieces of information may be stored, e.g. which service providers belong to the geolocation system, information about the anti-fraud system and how to contact it etc. A control unit 140 is provided comprising one or more processors which is responsible for the operation of the gateway. The control unit inter alia generates the commands that are needed to carry out the above discussed steps in which the privacy gateway 100 is involved. A memory 150 is provided which may be a read-only memory, a flash read-only memory, a random access memory, a mass storage, a hard disk or the like. The memory includes suitable program codes and computer programs with instructions to be executed by the control unit so as to implement the above described functionalities of the gateway 100. It should be understood that the structure shown in FIG. 5 is merely schematic and that the gateway may actually include further components which for the sake of clarity have not been illustrated. Furthermore, it should be understood that the different function entities need not to be incorporated into the separation entities as shown. Some of the different function entities may be implemented in a single entity or another separation in entities may be used. Furthermore, the entities may be incorporated by hardware or software or a combination of hardware and software.

From the above-described discussion, some generalized conclusions can be made. By way of example, when the privacy gateway 100 receives a vehicle message, it is checked whether the destination IP address of the service providing entity 40 contained in the IP data packets is known to the privacy gateway as a valid destination IP address for a service providing entity. Only if the destination IP address is known as a valid destination IP address, the source IP address is replaced and the adapted vehicle message is generated and transmitted to the service providing entity.

This helps to assure that only messages are generated to the service providing entity which have registered with the service providing entity and are a valid member in the geolocation messaging system. Furthermore, the privacy gateway can determine whether the received vehicle message is received from a trusted vehicle. The adapted vehicle message is only generated and transmitted to the service providing entity if the received vehicle message is received from a trusted vehicle. In the other case the received vehicle message may be dropped.

If the destination address of the service providing entity contained in the data packets is not known to the privacy gateway as a valid destination IP address for a service providing entity or if it is determined that the received vehicle message is received from a non-trusted vehicle, the data packets of the vehicle message may be dropped and the sender may be blacklisted, meaning that the vehicle is blacklisted and the vehicle message and all future messages and communication from and to the corresponding vehicle is blocked/dropped or ignored. The blacklisting and the resulting message blocking or dropping can be performed by informing an anti-fraud system. This anti-fraud system then determines and executes a set of activities to blacklist the corresponding mobile phone in the vehicle.

Furthermore, it can be seen that the communication channel between the end points, meaning the vehicle and the service provider, is split at a point before the vehicle data leave the mobile communications network or at a different point in the mobile communications network. The communication of the vehicle towards the outside world will terminate in a node inside the mobile communications network, namely the privacy protection gateway 100. When the service provider receives a message, it can still verify the authenticity of the message by verifying that the signature of the message was created with a valid certificate at a vehicle. The privacy gateway only forwards messages to the service providers it is aware of, i.e. service providers registered with their destination IP address at the privacy gateway 100. Messages containing other destination addresses are not forwarded and the sending entity may be blacklisted. Using the service provider's IP address is one way to determine if an IP packet needs special treatment. Another possibility is to assign a particular access point name for ITS services and forward all uplink traffic via that access point to the privacy gateway.

The advantage of substituting the sending vehicle's IP address with the IP address of the location collecting entity not revealing the identity of the vehicle is that no party outside the mobile communications network will be able to correlate the content of the message with the metadata (source IP address) and therefore the sender's location. This improves the privacy and leads in turn to a high acceptance at the consumer.

The filtering done at the privacy gateway by only forwarding messages to known service providers protects the system further by not allowing traffic which is sent to a target IP which does not belong to a Service Provider which is part of the system. The selection of the packets needing anonymous treatment by the APN or service provider destination address or both leaves other traffic untouched. The privacy gateway provides a well-known source of messages for the service providers. The service providers will only have to deal with few privacy gateways instead of a huge number of vehicles. Furthermore, the service provider will be able to address vehicles based on their location by using the location collecting entity.

The invention claimed is:

1. A method of processing data packets of vehicle messages received by a privacy gateway from vehicles via a mobile communications network, the method comprising:
receiving a first vehicle message transmitted by a first vehicle;
identifying a source IP address in data packets of the first vehicle message;
replacing the source IP address in the data packets of the first vehicle message with an IP address of a location-collecting entity of the mobile communications network which collects location information of a plurality of vehicles, resulting in an adapted vehicle message with adapted data packets containing the IP address of the location-collecting entity as source IP address;

transmitting the adapted vehicle message to a service-providing entity configured to provide location dependent services for the plurality of vehicles;
the method further comprising:
checking whether a destination IP address of the service-providing entity contained in the data packets is known to the privacy gateway as a valid destination IP address for a service-providing entity, wherein the replacing of the source IP address and the transmitting of the adapted vehicle message to the service-providing entity are responsive to determining that the destination IP address is known as a valid destination IP address.

2. A method of processing data packets of vehicle messages received by a privacy gateway from vehicles via a mobile communications network, the method comprising:
receiving a first vehicle message transmitted by a first vehicle;
identifying a source IP address in data packets of the first vehicle message;
replacing the source IP address in the data packets of the first vehicle message with an IP address of a location-collecting entity of the mobile communications network which collects location information of a plurality of vehicles, resulting in an adapted vehicle message with adapted data packets containing the IP address of the location-collecting entity as source IP address;
transmitting the adapted vehicle message to a service-providing entity configured to provide location dependent services for the plurality of vehicles;
the method further comprising:
determining whether the received first vehicle message is received from a trusted vehicle, wherein the step of determining whether the received first vehicle message is received from a trusted vehicle comprises determining whether the received first vehicle message is signed with a valid certificate and wherein the replacing of the source IP address and the transmitting of the adapted vehicle message to the service-providing entity are responsive to determining that the received vehicle message is received from a trusted vehicle.

3. The method of claim 2, wherein if the received first vehicle message is signed with a valid certificate, the certificate is transmitted to the location-collecting entity.

4. A method of processing data packets of vehicle messages received by a privacy gateway from vehicles via a mobile communications network, the method comprising:
receiving a first vehicle message transmitted by a first vehicle;
identifying a source IP address in data packets of the first vehicle message;
replacing the source IP address in the data packets of the first vehicle message with an IP address of a location-collecting entity of the mobile communications network which collects location information of a plurality of vehicles, resulting in an adapted vehicle message with adapted data packets containing the IP address of the location-collecting entity as source IP address;
transmitting the adapted vehicle message to a service-providing entity configured to provide location dependent services for the plurality of vehicles;
wherein the method further comprises:
receiving a second vehicle message transmitted by a second vehicle;
checking whether a destination IP address contained in data packets of the second vehicle message is known to the privacy gateway as a valid destination IP address for a service-providing entity; and,
responsive to determining that the destination IP address contained in the data packets of the second vehicle message is not known to the privacy gateway as a valid destination IP address for a service-providing entity, dropping the data packets of the second vehicle message.

5. The method of claim 4, further comprising, responsive to determining that the destination IP address contained in the data packets of the second vehicle message is not known to the privacy gateway as a valid destination IP address for a service-providing entity, blacklisting the second vehicle message and dropping or ignoring all further vehicle messages and communication from and to the second vehicle.

6. The method of claim 5, where the blacklisting and the resulting message dropping or ignoring are performed by informing an anti-fraud system about the blacklisting.

7. A method of processing data packets of vehicle messages received by a privacy gateway from vehicles via a mobile communications network, the method comprising:
receiving a first vehicle message transmitted by a first vehicle;
identifying a source IP address in data packets of the first vehicle message;
replacing the source IP address in the data packets of the first vehicle message with an IP address of a location-collecting entity of the mobile communications network which collects location information of a plurality of vehicles, resulting in an adapted vehicle message with adapted data packets containing the IP address of the location-collecting entity as source IP address;
transmitting the adapted vehicle message to a service-providing entity configured to provide location dependent services for the plurality of vehicles;
wherein the method further comprises:
receiving a second vehicle message transmitted by a second vehicle;
determining whether the received second vehicle message is received from a trusted vehicle; and,
responsive to determining that the received second vehicle message is not received from a trusted vehicle, dropping the data packets of the second vehicle message.

8. The method of claim 7, further comprising, responsive to determining that the received second vehicle message is not received from a trusted vehicle, blacklisting the second vehicle message and dropping or ignoring all further vehicle messages and communication from and to the second vehicle.

9. The method of claim 8, where the blacklisting and the resulting message dropping or ignoring are performed by informing an anti-fraud system about the blacklisting.

10. A privacy gateway configured to process data packets of vehicle messages received at a privacy gateway from vehicles via a mobile communications network, the privacy gateway comprising:
a receiver configured to receive a first vehicle message sent by a first vehicle;
a processor and memory, said memory containing instructions executable by said processor circuit whereby said processor circuit and memory are configured to identify a source IP address in data packets of the first vehicle message and replace the source IP address in the data packets of the first vehicle message with an IP address of a location-collecting entity of the mobile communications network which collects location information of a plurality of vehicles, resulting in an adapted vehicle message with adapted data packets containing the IP address of the location-collecting entity as source IP address;
a transmitter configured to transmit the adapted vehicle message to a service-providing entity configured to provide location dependent services for a plurality of vehicles; and
a database containing at least one destination address of at least one service-providing entity, wherein the processor circuit and memory are configured to check whether a destination address contained in the data packets of the first vehicle message is stored in the database as a valid destination IP address for a service-providing entity, and wherein the processing circuit and memory are configured to replace the source IP address in the first vehicle message and transmit the adapted vehicle message to the service-providing entity responsive to determining that the destination address is stored in the database as a valid destination IP address.

11. A privacy gateway configured to process data packets of vehicle messages received at a privacy gateway from vehicles via a mobile communications network, the privacy gateway comprising:
a receiver configured to receive a first vehicle message sent by a first vehicle;
a processor and memory, said memory containing instructions executable by said processor circuit whereby said processor circuit and memory are configured to identify a source IP address in data packets of the first vehicle message and replace the source IP address in the data packets of the first vehicle message with an IP address of a location-collecting entity of the mobile communications network which collects location information of a plurality of vehicles, resulting in an adapted vehicle message with adapted data packets containing the IP address of the location-collecting entity as source IP address;
a transmitter configured to transmit the adapted vehicle message to a service-providing entity configured to provide location dependent services for a plurality of vehicles;
wherein the processing circuit and memory are configured to, for determining whether the received first vehicle message is received from a trusted vehicle, determine whether the received first vehicle message is signed with a valid certificate.

12. The privacy gateway of claim 11, wherein the processing circuit and memory are configured to control the transmitter to transmit the certificate to the location-collecting entity in response to determining that the received vehicle message is signed with a valid certificate.

13. A privacy gateway configured to process data packets of vehicle messages received at a privacy gateway from vehicles via a mobile communications network, the privacy gateway comprising:
a receiver configured to receive a first vehicle message sent by a first vehicle;
a processor and memory, said memory containing instructions executable by said processor circuit whereby said processor circuit and memory are configured to identify a source IP address in data packets of the first vehicle message and replace the source IP address in the data packets of the first vehicle message with an IP address of a location-collecting entity of the mobile communications network which collects location information of a plurality of vehicles, resulting in an adapted vehicle message with adapted data packets containing the IP address of the location-collecting entity as source IP address;
a transmitter configured to transmit the adapted vehicle message to a service-providing entity configured to provide location dependent services for a plurality of vehicles;
wherein the receiver is configured to receive a second vehicle message transmitted by a second vehicle, and wherein the processing circuit and memory are configured to:
check whether a destination IP address contained in data packets of the second vehicle message is known to the privacy gateway as a valid destination IP address for a service-providing entity; and,
responsive to determining that the destination IP address contained in the data packets of the second vehicle message is not known to the privacy gateway as a valid destination IP address for a service-providing entity, drop the data packets of the second vehicle message.

14. The privacy gateway of claim 13, wherein the processing circuit and memory are further configured to, responsive to determining that the destination IP address contained in the data packets of the second vehicle message is not known to the privacy gateway as a valid destination IP address for a service-providing entity, blacklist the second vehicle message and drop or ignore all further vehicle messages and communication from and to the second vehicle.

15. The privacy gateway of claim 14, wherein the processing circuit and memory are configured to inform an anti-fraud system about the blacklisting.

16. A privacy gateway configured to process data packets of vehicle messages received at a privacy gateway from vehicles via a mobile communications network, the privacy gateway comprising:
a receiver configured to receive a first vehicle message sent by a first vehicle;
a processor and memory, said memory containing instructions executable by said processor circuit whereby said processor circuit and memory are configured to identify a source IP address in data packets of the first vehicle message and replace the source IP address in the data packets of the first vehicle message with an IP address of a location-collecting entity of the mobile communications network which collects location information of a plurality of vehicles, resulting in an adapted vehicle message with adapted data packets containing the IP address of the location-collecting entity as source IP address;
a transmitter configured to transmit the adapted vehicle message to a service-providing entity configured to provide location dependent services for a plurality of vehicles;
wherein the receiver is configured to receive a second vehicle message transmitted by a second vehicle, and wherein the processing circuit and memory are configured to:
determine whether the received second vehicle message is received from a trusted vehicle; and,
responsive to determining that the received second vehicle message is not received from a trusted vehicle, drop the data packets of the second vehicle message.

17. The privacy gateway of claim 16, wherein the processing circuit and memory are further configured to, responsive to determining that the received second vehicle message is not received from a trusted vehicle, blacklist the second vehicle message and drop or ignore all further vehicle messages and communication from and to the second vehicle.

18. The privacy gateway of claim 17, wherein the processing circuit and memory are configured to inform an anti-fraud system about the blacklisting.

\* \* \* \* \*